UNITED STATES PATENT OFFICE.

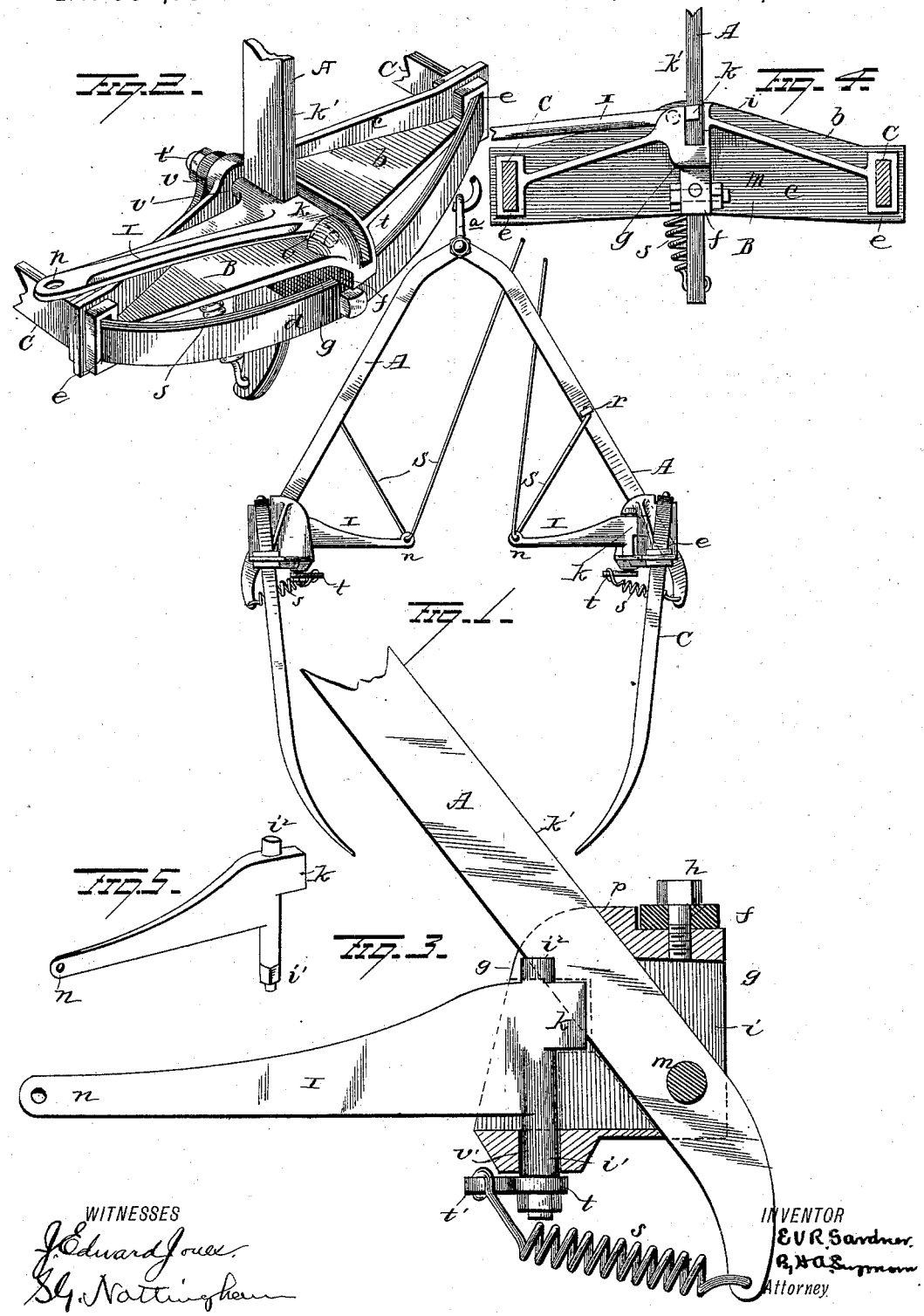

EMMET V. R. GARDNER, OF WEST TOWN, NEW YORK.

HAY-FORK.

SPECIFICATION forming part of Letters Patent No. 358,738, dated March 1, 1887.

Application filed November 11, 1886. Serial No. 218,564. (No model.)

*To all whom it may concern:*

Be it known that I, EMMET V. R. GARDNER, of West Town, in the county of Orange and State of New York, have invented certain new and useful Improvements in Hay-Forks; and I do hereby declare the following to be a full, clear, and exact description of the invention, such as will enable others skilled in the art to which it appertains to make and use the same.

My invention relates to horse hay-forks, and more particularly to the type known as "grappling" hay-forks.

The object of my invention is to simplify and improve the construction of the horse hay-forks patented to me September 22, 1874, and also December 11, 1877, numbered, respectively, 155,233 and 198,101.

A further object is to provide a hay-fork that will have but few working parts, that will be strong and reliable in operation, and that can be made at a low initial cost.

With these objects in view my invention consists in certain features of construction and combinations of parts, that will be hereinafter described, and pointed out in the claims.

In the drawings making a part of this specification, Figure 1 is a side view of the hay-fork extended to grapple a load. Fig. 2 is an enlarged perspective view of one of the heads with improved features shown. Fig. 3 is a view in elevation, partly in vertical section, of one of the heads, tines, and attached parts. Fig. 4 is a plan view, partly in section, of one of the heads, tines, and attached parts. Fig. 5 is a side view of a locking-lever.

In my improved fork patented September 22, 1874, No. 155,233, is shown two arms that are pivotally connected at their free ends by a clevis, to which is attached the leading rope or chain that supports the loaded and traveling fork, the load being tripped at a desired point by a supplementary rope attached to cam-levers, the main arms being composed of several united bars.

In the patent issued to me December 11, 1877, an improved head for holding the grappling-teeth is shown.

In my present improvement I have reduced the working parts, locating these simplified parts compactly, using some of the features shown in my previous patents above mentioned, but in different combination with novel parts, thus producing a very simple, highly efficient, and novel implement.

In the drawings, A are the arms of the hay-fork. These are two in number, and are made of metal, a suitable length and thickness being provided. The inner ends are perforated with holes for the reception of a swivel-clevis, $a$, to which the fork is suspended and operated to hoist a load. At the outer ends of the arms A the heads B are secured. These are preferably cast into form, any suitable metal being used. Malleable iron, cast-iron, or soft-steel castings may be utilized. Preference is given to cast-iron, as a sufficiently strong and a much cheaper material than the others named. The heads B are shaped substantially as shown in the figures, being a flat yoke, $c$, having a longitudinal rib or stiffening-flange, $b$, erected at a right angle from the base-plate $c$, and made integral with this plate. The outer ends of the plate $c$ are slotted transversely to form rectangular holes $e$, for the reception of the tines of the fork. These tines C are formed of flat bars of metal, preferably terminating in steel points. Each head B has two parallel teeth or tines, that are formed integral by bending a single bar of metal at its center to form an arch at that point, the curvature of the arches $d$ being such that the parallel depending portions of a bent bar that forms a set of tines for a head will be a suitable definite distance apart, and this distance will permit the tines to slide into the neatly-fitting slots $e$, that have been provided in the extremities of the heads. A proper curvature is given to the tines C, they being bent to curve inwardly, to give the set necessary to fit them for carrying a load of hay between the opposed pairs of tines with which the two similar heads B are furnished.

The heads B at a central point, considered lengthwise, are each provided with a bracket or short vertical rib, $g$, that is of such relative height as to form a seat for the curved parts of each set of twin tines C, and these tines C are secured in place on the projections $f$ by bolts $h$, inserted in holes made in the body of the tines at the center or crown of their arched portions. (See Fig. 3.) At a point midway between the ends of the heads B a transverse slot, $i$, is made in each, that is preferably formed in the body of the vertical bracket projections $g$. The slots $i$ are provided for the accommodation of the arms A, these arms being pivoted therein at a point, $m$, in each head.

It will be noticed that the slots $i$ in the heads B are cut through the bottom plates, $c$, which slots in these plates $c$ are extended a short distance to the rear of the pivotal point $m$, so that the arms A may be given a vertical vibration in the slots $i$. At a point in the longitudinal ribs $b$ the slots $i$ are cut through the top surface, to permit a further vibration of the arms A in these slots $i$, the extreme limit of the vibratory movement being determined by the shoulders $p$, that are the terminations of these open slots $i$ on the top of the heads B. The arms A are projected a short distance outside of the heads B, and are perforated, to fix spiral springs $s$ to them.

The stiffening-ribs $b$ are cut away on their inner faces to form a shoulder, $v$, upon each of the heads B, and a bearing-face on each of the bottom plates or yokes, $c$, that is immediately below the shoulders just named.

The shoulders $v$ are perforated a certain distance from below, to form receiving-sockets $v'$ therein, and the plates $c$ are correspondingly perforated through their bodies.

A locking-lever, I, is provided, to be pivotally secured in swinging adjustment at the points on the heads B that have just been described.

The levers or locking-arms I are made of proper length to obtain necessary leverage, and have rounded projections $i'$ $i^2$ formed upon them. These projections are of such relative size to the holes $v'$ in the heads B that when they are inserted in them a free lateral swinging movement of the levers I will be obtained, the pintles $i'$ $i^2$ forming fulcrum-points for such vibratory movement. Upon the lower squared projecting end of the pintle $i'$ of the lever I, when in its position on a head, B, is affixed a short horizontal lever, $t$. (See Fig. 2.) This lever is placed in such a relative position to the locking-lever I that by connecting its free end $t'$ with the spiral spring $s$, the opposite end of which is attached to a main arm, A, of the fork, the locking-lever I will be drawn by the contractile force of the spring $s$, so as to have its body parallel with the side of the head B upon which it is placed.

The levers I (see Fig. 5) are made with a projecting shoulder, $k$. This, when a lever is parallel with the body of the head B, will assume a position just above the top edge, $k'$, of the arm A, and thus lock the arm A upon the head, so that its lower edge and the face of the yoke-plate $c$ on which it bears will be in close secured contact. This relative position of the head B and arm A is obtained when the fork is set for a load, and is maintained while loaded or until the levers I are moved to release the arms A.

The locking-levers I are perforated at their free ends $n$, for the attachment of the tripping cords or chains S. These are extended and passed through the eyes on the heads of the eyebolts $r$, that are rigidly secured in perforations made for them in the sides of the arms A. The position given the eyebolts $r$ is such as to afford full swing motion of the levers I, and permit them to fold in contact with the bodies of the arms A, when the tripping-cords S are pulled to deposit a load.

The tripping cords or chains S are extended a proper length and then joined together, and at the point of junction a single rope is extended to make it convenient of access to unload a forkful.

It will be noticed that by this mode of construction the levers I perform two functions: first, to set the heads to receive a load; second, to hold in locked position the loaded fork-tines and discharge the load when pulled into proper position to unlock from the main arms of the fork. This they are enabled to do by reason of the relative position these levers I assume to the arms A when the tines C are pendent and the head B is unlocked, (see Fig. 3,) in which the angular divergence of the levers I below the arms A permits a pulling action on the trip-cords S to elevate the tines C, and by slacking these cords to lock them. A load, having been secured while in this position of the heads B, can be elevated and transported to any determined point, and then by a pull upon the tripping-rope be deposited, the tines C hanging pendent and ready to be set by a second pull upon the same cord that discharged the load.

Slight changes might be made in the construction of this device without exceeding the scope and spirit of my invention. I do not, therefore, restrict myself to the exact form shown; but, Having fully described my invention, what I claim as new, and desire to secure by Letters Patent, is—

1. In an elevating hay-fork, the combination, with two arms, each having a transverse head and fork-tines secured thereto, of a locking-lever on each head, a spring to each lever, and a rope for releasing the heads, substantially as set forth.

2. In an elevating hay-fork, the combination, with two arms, each having a transverse head and fork-tines secured thereto, of a locking-lever on each head, a spring connected to each lever, and a rope connected to both locking-levers for moving them simultaneously, substantially as set forth.

3. In an elevating hay-fork, the combination, with two heads and arms pivoted thereto, of a pair of connected tines in each head, a locking-lever for each head, a spring for each lever, and ropes for operating the locking-levers, substantially as set forth.

4. In an elevating hay-fork, the combination, with two arms, of two heads, tines secured thereto, a locking-lever for each head, springs connecting the arms and locking-levers, a trip-rope for each locking-lever, and a leading eye-bolt on each arm to support the trip-ropes in operative position, substantially as set forth.

In testimony whereof I have signed this specification in the presence of two subscribing witnesses.

EMMET V. R. GARDNER.

Witnesses:
CELIA WOLF,
ESTHER WOLF.